United States Patent [19]
Domian

[11] Patent Number: 4,915,638
[45] Date of Patent: Apr. 10, 1990

[54] PROTECTIVE ENCLOSURE FOR ELECTRICAL OUTLETS

[76] Inventor: Anthony Domian, D3 Sandpiper Condominium, 9th Ave., N. Myrtle Beach, S.C. 29582

[21] Appl. No.: 187,861

[22] Filed: Apr. 29, 1988

[51] Int. Cl.$^4$ .............................................. H01R 13/44
[52] U.S. Cl. .................................. 439/142; 439/367; 439/893; 174/67
[58] Field of Search ............................. 439/142–145, 439/367, 892, 893; 174/67

[56] References Cited

U.S. PATENT DOCUMENTS

| | | | |
|---|---|---|---|
| 2,157,957 | 5/1939 | Heise et al. | 174/48 |
| 2,510,745 | 6/1950 | Kilgore | 174/48 |
| 2,526,606 | 10/1950 | Gregg | 174/67 |
| 2,880,264 | 3/1959 | Ruskin | 174/67 |
| 3,491,327 | 1/1970 | Tait et al. | 339/36 |
| 4,603,932 | 8/1986 | Heverly | 439/142 |
| 4,723,823 | 2/1988 | Pinkerton et al. | 439/136 |

Primary Examiner—P. Austin Bradley
Attorney, Agent, or Firm—Richard V. Westerhoff

[57] ABSTRACT

A box-like cover is hinged to a base plate to form a protective enclosure for electrical outlets. An integral cantilevered locking tab is formed by a spaced pair of slots extending inward from the edge of the cover through which cords plugged into the outlet pass. A hook member on the end of the cantilevered locking tab engages a ledge formed by a slot in the base plate to secure the cover in the closed position. The cantilevered locking tab provides a flexible latch which is easily operated by the informed, but is not obvious to a child. The cover may be opaque or transparent for use with a night light.

4 Claims, 1 Drawing Sheet

U.S. Patent    Apr. 10, 1990    4,915,638
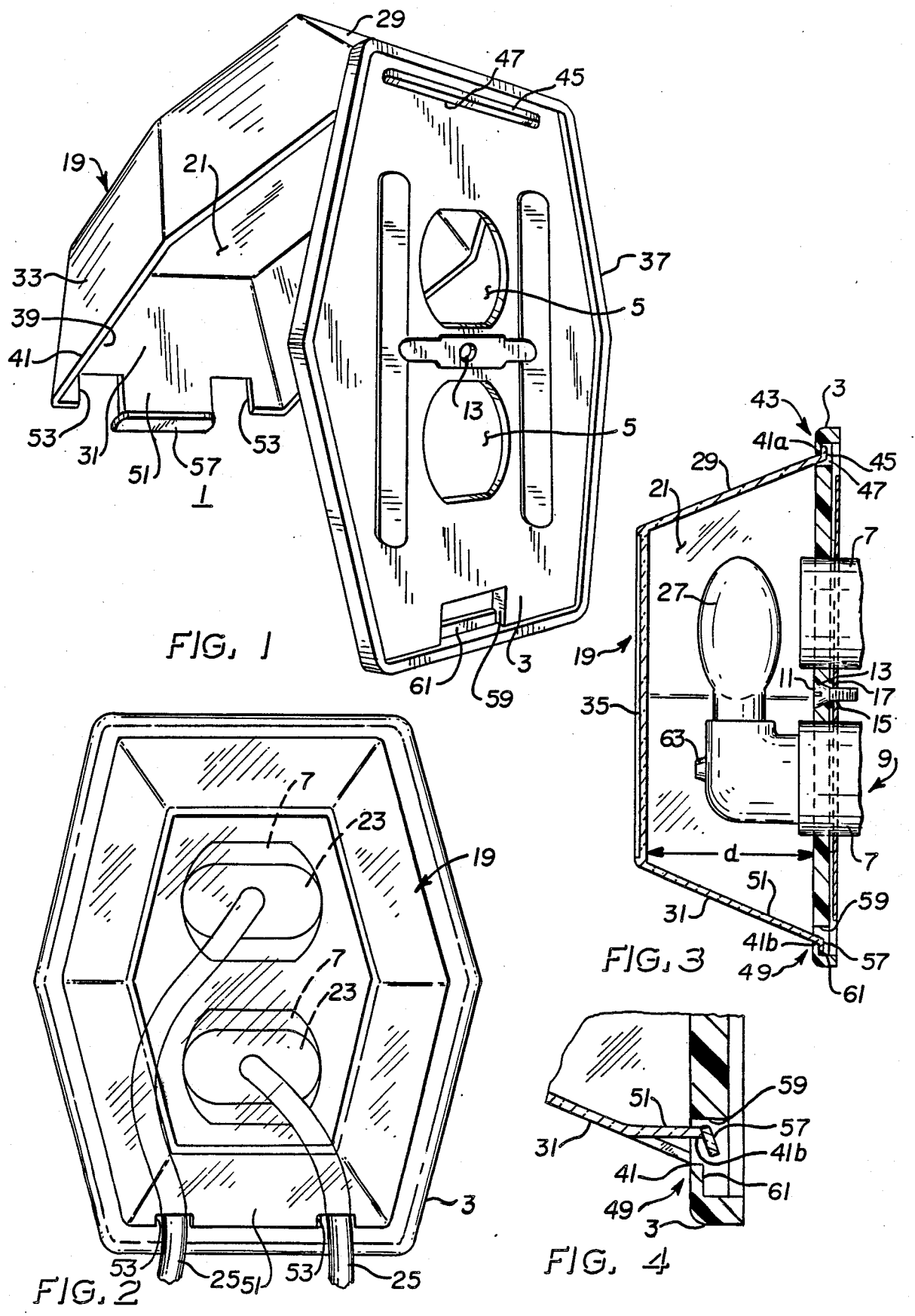

PROTECTIVE ENCLOSURE FOR ELECTRICAL OUTLETS

BACKGROUND OF THE INVENTION

Related Applications

My design application serial number 07/067,091 filed on June 29, 1987 entitled Protective Cover for Electric Outlet which is a continuation of design application serial number 07/045,662 filed on May 1, 1987 and now abandoned.

Field of the Invention

This invention relates to an enclosure for covering an electrical outlet to preclude inadvertent or unsafe contact with the outlet such as by children, without interfering with electrical devices including electrical cords and night lights plugged into the outlet.

Background Information

Electrical outlets such as are found in the home present a safety hazard to children who are likely to insert objects into the outlet which can cause electrical shock. Children could also be burned by night lights which are often plugged into such outlets. In addition, electrical devices plugged into the outlet can be disconnected either deliberately or inadvertently.

There have been many types of covers proposed for limiting access to electrical outlets. Some of these covers such as those represented by U.S. Pat. No. 2,157,959, require tools for installation and removal, and some such as the safety cover disclosed in U.S. Pat. No. 3,491,327 can be removed easily merely by sliding the cover upward. The cover disclosed in the latter patent also is not completely enclosed on the bottom providing room for access by a child's fingers or other objects.

Other known protective covers for outlets utilize a flexible cover which may be squeezed to latch and unlatch hooks which secure the cover to a base plate. Examples of such protective covers are disclosed in U.S. Pat. Nos. 2,526,606 and 2,880,264. In another protective cover, disclosed in U.S. Pat. No. 2,510,745, spring clips on the base plate snap into recesses in the cover to secure the cover in place. A button underneath the cover is depressed to release the spring latch. The box-like cover in this device is transparent so that plugs installed in the outlet are visible with the cover in place.

All of the above protective covers for electrical outlets have slots or other openings through which an electrical cord plugged into the outlet can pass. For the most part, these are just slots extending inward in the edge of the cover at some convenient location.

There remains a need for an improved protective enclosure for electrical outlets which is easy to operate by an informed person yet is not easily operated by a child.

SUMMARY OF THE INVENTION

This need and others are satisfied by the present invention which is directed to a protective enclosure for an electrical outlet which includes a base plate with an opening for the electrical outlet. A cover defines a cavity which has a substantially planar opening defined by the edge of the cover and is deep enough to accommodate devices plugged into the outlet. A pivot connection secures the edge of the cover to the base plate at one location for pivoting the cover between an open position providing access to the electrical outlet and a closed position in which the planar opening of the cover buts against the base plate to enclose the electrical outlet. A pair of spaced slots extending into the cover from the edge at a second location, preferably opposite the pivot connection, define between them a cantilevered locking tab which forms part of a latching mechanism for locking the cover in the closed position. The slots are dimensioned to permit the passage therethrough of electrical cords connected to electrical plugs inserted in the electrical outlet. A hook member secured to the edge of the cover at the locking tab projects laterally outward from the locking tab substantially in a plane parallel to the planar opening of the cover. The base plate includes a catch which defines a ledge under which the hook member engages.

The slots defining the cantilevered locking tab are spaced apart such that the locking tab is sufficiently flexible that it can be displaced generally in a direction parallel to the plane of the opening in the cover to disengage the hook member from the ledge of the catch. Preferably, the catch is a slot in the base plate with the portion of the base plate adjacent the slot forming the ledge which is engaged by the hook member.

In the preferred embodiment of the invention, the cover has side walls, top and bottom walls, and a front wall, with the pivot connection extending along the edge of the cover at the top wall and with the slots defining the locking tab extending inward into the cover from the edge along the bottom wall.

Also preferably, the catch comprises a slot in the base plate with the base plate adjacent the slot forming the ledge which is engaged by the hook member.

This novel arrangement provides a protective enclosure for an electrical outlet which effectively combines a hidden latching mechanism with the openings for electrical cords plugged into the outlet. The latching mechanism is easily operated by an informed user since the slots for the cords define a latching tab which is cantilevered out from the main body of the cover and can be dimensioned to provide the appropriate amount of flexibility. Thus, while the locking tab is an integral part of the cover, the entire cover need not be easily flexed since the cantilevered construction of the locking tab provides leverage for operation of the locking mechanism.

BRIEF DESCRIPTION OF THE DRAWINGS

A full understanding of the invention can be gained from the following description of the preferred embodiment when read in conjunction with the accompanying drawings in which:

FIG. 1 is an isometric view of a protective enclosure for an electrical outlet with an opaque cover shown open as viewed from behind and to right.

FIG. 2 is a front elevation view of a protective enclosure of FIG. 1 but with a closed transparent cover.

FIG. 3 is a vertical section through the protective enclosure of FIGS. 1 and 2 and showing its use in connection with a night light.

FIG. 4 is a portion of FIG. 3 showing the locking mechanism in the unlatched position.

DESCRIPTION OF THE PREFERRED EMBODIMENTS

As shown in the drawings, the protective enclosure 1 of the invention includes a base plate 3 having openings 5 through which the two sockets 7 of a conventional electrical outlet 9 extend when the base plate is installed over the outlet. The base plate is secured in place by a screw 11 which is seated in a tapered bore 13 in the base plate and which is threaded into a tapped bore 15 in a support 17 for the sockets 5.

A box-like cover 19 defines a cavity 21 which has a depth, d, sufficient to accommodate electrical devices, such as for example plugs 23 of electrical cords 25 and night light 27, plugged into the sockets 7 of the electrical outlet 9. The cover 19 has a top wall 29, bottom wall 31 and side walls 33 which taper inward to a flat front wall 35. In the embodiment shown, the side walls 33 project outward in two intersectioning planes. The side edges 37 of the base plate project outward in a similar manner. This particular shape is ornamental and is not essential to this invention.

The cavity 21 formed by the cover 21 has a planar opening 39 defined by the edge 41 of the cover. The cover 19 is pivotally connected to the base plate 3 by a pivot connection 43 which, in the exemplary embodiment, includes a lip 45 projecting outwardly in a direction generally parallel to the plane of opening 39 from the edge 41a of the cover which extends slightly beyond the plane of opening 39 along the top wall 31. This lip 45 is received in a horizontal slot 47 in the base plate 3. With the lip 45 engaged in the slot 47, the cover 19 can be pivoted between an open position, such as shown in in FIG. 1, providing access to the sockets 7, and a closed position shown in FIG. 3 in which the edge 41 of the cover 19 buts against the base plate 3 to enclose the sockets within the cavity 21 Alternatively, the base plate and cover can be molded in one piece with an integral hinge.

A latching mechanism 49 secures the cover 19 in the closed position. This latching mechanism includes a cantilevered locking tab 51 formed in the bottom wall 31 of the cover by a pair of slots 53 spaced along and extending inward from the edge 41 of the cover 19. The slots are dimensioned to permit passage therethrough of electrical cords 25 plugged into the sockets 7. The edge 41b of the locking tab extends slightly beyond the plane of the opening 39 in the cover 19. A hook member 57 on the locking tab projects transversely from the edge 41b in an outward direction generally parallel to the plane of the opening 39 in the cover 19. A catch on the base plate 3, which in the preferred embodiment is a slot 59, defines a ledge 61 which is engaged by the hook member 57 as shown in FIG. 3. The cantilevered locking tab 51 is deflected as shown in FIG. 4 to align the projection 57 with the slot 59 for engaging and disengaging the latching mechanism.

The cover 19 is made of a flexible material, preferably a resin such as for example polyvinylchloride. The flexibility provided by the cantilevered locking tab allows the remainder of the integrally molded cover to be stiffer than is possible with prior outlet covers which rely upon flexing of the cover for locking and unlocking. The spacing of the slots 53, and, therefore, the width of the locking tab 51, can be selected along with the thickness of the tab to provide the desired stiffness of the latching mechanism.

The cover 19 may be made of either a transparent or an opaque material. The transparent cover can be used with a night light 27 as shown in FIG. 3 which, if desired, can be controlled by a photocell 63 as is well known. While a transparent cover can be used also when the protective enclosure is used to enclose plugs as shown in FIG. 2, it may be preferred in such applications to use an opaque cover which hides the plugs from view when closed.

The unique arrangement in which the slots 53 for electrical cords define a cantilevered locking tab provide a protective enclosure for an electrical outlet which can be easily operated by an informed user due to the flexibility of the locking tab, yet is not easily operated by a child.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A protective enclosure for electrical outlets comprising a base plate having openings therein for receiving an electrical outlet, a cover defining a cavity having a depth sufficient to accommodate electrical devices plugged into said electrical outlet and having a generally planar opening rimmed by an edge, a pivot connection pivotally connecting said cover to said base plate at a first location on said edge for pivoting said cover between an open position providing access to said electrical outlet and a closed position in which said generally planar opening of said cover buts against said base plate to enclose said electrical outlet, a pair of spaced slots extending into said cover from said edge to a second location spaced from the first location to define between said slots a cantilevered locking tab, said slots being dimensioned to permit the passage therethrough of electrical cords connected to electrical plugs inserted in the electrical outlet, and a hook member secured to the edge of the cover along said locking tab and projecting outward substantially in a direction parallel to said planar opening, said base plate having a catch member defining a ledge under which the hook member engages, said pair of slots being spaced from one another such that the cantilever locking tab substantially lies in a common plate with said slots and is sufficiently flexible that it can be displaced generally in a direction transverse to the common plane with said slots to engage and disengage said hook member from the ledge of the catch.

2. The enclosure of claim 1 wherein said said catch member is a slot in said base plate.

3. The enclosure of claim 1 wherein said cover has side walls, top and bottom walls, and a front wall, with said pivot connection extending along the edge of the cover at the top wall, and with said slots defining said cantilevered locking tab extending inward into the cover from the edge along the bottom wall.

4. The enclosure of claim 1 in which said cover is made of transparent material in combination with a night light which is plugged into the electrical outlet.

* * * * *

UNITED STATES PATENT AND TRADEMARK OFFICE
CERTIFICATE OF CORRECTION

PATENT NO. : 4,915,638

DATED : April 10, 1990

INVENTOR(S) : ANTHONY DOMIAN

It is certified that error appears in the above-identified patent and that said Letters Patent is hereby corrected as shown below:

Column 3, line 31, a period --.-- should be inserted after "21".

Column 4, line 48, "plate" should be --plane--.

Claim 2, column 4, line 53, "said" (first occurrence) should be deleted.

Signed and Sealed this

Ninth Day of June, 1992

Attest:

DOUGLAS B. COMER

Attesting Officer

Acting Commissioner of Patents and Trademarks